(12) United States Patent
Unger

(10) Patent No.: US 6,909,837 B1
(45) Date of Patent: Jun. 21, 2005

(54) METHOD AND SYSTEM FOR PROVIDING ALTERNATIVE, LESS-INTRUSIVE ADVERTISING THAT APPEARS DURING FAST FORWARD PLAYBACK OF A RECORDED VIDEO PROGRAM

(75) Inventor: Robert Allan Unger, ElCajon, CA (US)

(73) Assignee: Sony Corporation, Tokyo (JP)

( * ) Notice: Subject to any disclaimer, the term of this patent is extended or adjusted under 35 U.S.C. 154(b) by 1132 days.

(21) Appl. No.: 09/711,448

(22) Filed: Nov. 13, 2000

(51) Int. Cl.⁷ .................................................. H04N 5/91
(52) U.S. Cl. ......................................... 386/68; 386/95
(58) Field of Search .............................. 386/46, 68, 69, 386/70, 95, 94, 125–126; H04N 5/91

(56) References Cited

U.S. PATENT DOCUMENTS

| | | |
|---|---|---|
| 5,973,723 A | 10/1999 | DeLuca |
| 5,987,210 A | 11/1999 | Iggulden et al. |
| 6,006,257 A | 12/1999 | Slezak |
| 6,011,537 A | 1/2000 | Slotznick |
| 6,038,367 A | 3/2000 | Abecassis |
| 6,070,185 A | 5/2000 | Nishio |
| 6,070,186 A * | 5/2000 | Nishio ........................ 725/92 |
| 6,088,455 A | 7/2000 | Logan et al. |
| 6,574,424 B1 * | 6/2003 | Dimitri et al. ............. 386/125 |
| 2001/0046368 A1 * | 11/2001 | Tada et al. .................... 386/46 |

* cited by examiner

*Primary Examiner*—Vincent Boccio
(74) *Attorney, Agent, or Firm*—Steven L. Nichols; Rader, Fishman & Grauer PLLC

(57) ABSTRACT

A digital video recorder can be used to allow users to fast forward through segments of a recorded video signal, such as commercial breaks, while still allowing the advertiser a limited opportunity to present an advertising message. Frames from the commercial recorded with the video signal are electronically tagged. When the processor of the digital video recorder finds a tagged frame or frames during a fast forward operation, the processor may display the tagged frame as a static image during the fast forward operation or may play the series of tagged frames at normal speed as a condensed video clip during the fast forward operation. Thus, through a static image or a condensed video clip, an advertiser can present an advertising message, while the user may still skip the full-length commercials as quickly as before.

20 Claims, 4 Drawing Sheets

US 6,909,837 B1

METHOD AND SYSTEM FOR PROVIDING ALTERNATIVE, LESS-INTRUSIVE ADVERTISING THAT APPEARS DURING FAST FORWARD PLAYBACK OF A RECORDED VIDEO PROGRAM

FIELD OF THE INVENTION

The present invention relates to the field of video recording, particularly the recording of broadcast television signals, whether broadcast over-the-air, by cable network, satellite system or some other means. More specifically, the present application relates to a method and system of providing alternative, less-intrusive advertising that appears during fast forward of the playback of a recorded television program.

BACKGROUND OF THE INVENTION

Television is widely used in modern society as a source of both information and entertainment. Cable and satellite systems can supplement local over-the-air broadcasting to provide dozens or even hundreds of channels of programming. With so much programming available, it may be difficult for a viewer to be available to watch all the programming he or she wishes to see at the times those programs are broadcast.

Consequently, there a number of electronic devices that have been developed to record broadcast television signals. In this way, the viewer can "time-shift" a program by recording the program when it is broadcast, but then replaying it for viewing at a time convenient to the viewer. These recording devices may be generally categorized as video cassette recorders (VCRs) and Personal Video (or Versatile) Recorders (PVRs).

A VCR uses a magnetic tape to allow the user to record incoming audiovisual programming while watching the same or a different channel. A timer in the VCR allows the user to record broadcast programming according to a pre-programmed recording schedule. Consequently, programs can be recorded even when the user is away and cannot watch the desired programming or operate the VCR. As mentioned above, the recording is then available for playback at the user's convenience.

The basic concept of the VCR has been extended to digital compression devices that provide even more features for managing the reception and recording of audiovisual programming. These products have a number of names such as personal television products, personal video recorders, video recording computers, personal television servers, etc., (referred to collectively as "personal video recorders" or "PVRS" hereafter). Current examples of personal video recorders include the TiVo® system made by TiVo, Inc. and the ReplayTV® system made by Reply Networks, Inc.

Personal video recorders replace the video cassette recording medium with a hard drive or other digital memory device internal to the recorder. The personal video recorder is connected between a user's television set and that user's cable box, satellite receiver or antenna. The personal video recorder can control the channel tuned on the television, provide an interactive electronic program guide and record programming on a manual or timer-controlled basis. Additionally, the personal video recorder can buffer incoming audiovisual programming so that the viewer can pause a live television program or replay a portion of a live television program without missing any subsequent segment of the program, as long as the pause or replay does not exceed the capacity of the buffer.

In even more advanced features, the personal video recorder can be programmed to regularly record a user's favorite programs and then also record other programs of the same genre that the user may be interested in watching. Thus, the personal video recorder may help a user Watch audiovisual programming that the user is interested in, but was not even aware of at the time it was broadcast. Consequently, the PVR provides even more flexibility in recording and capturing incoming audiovisual signals than is available with a VCR.

In addition to the educational or entertainment program, advertisements or commercials are interspersed with the main programming and broadcast as part of the television signal. These advertisements can provide viewers with important information related to products and services of which viewers have a need. The advertising that accompanies broadcast television programming is a critical source of revenue for the broadcaster and provides the advertiser with an unequalled opportunity to reach customers and potential customers with product information.

However, advertising is often considered a nuisance by the viewer who wishes to watch the program without interruption. Consequently, when the viewer has recorded the program with, for example, a VCR or PVR, the viewer will tend to fast forward the video playback during commercials. Usually there is no audio playback during a fast forward operation. Consequently, the commercial is muted, the images are accelerated and the interruption to viewing the recorded program is minimized.

While convenient to the viewer, this ability to avoid commercial messages in recorded broadcast programming is detrimental to both the advertiser who is trying to reach potential customers and the broadcaster who depends upon advertising for critical revenue. Consequently, there is a need in the art for a system and method that still allow a viewer who has recorded broadcast programming to, if desired, minimize the interruption to the programming caused by interspersed commercial messages, while also protecting the broadcaster's source of revenue by providing the advertiser with a means of reaching potential customers with, at least, an abbreviated advertising message.

SUMMARY OF THE INVENTION

The present invention provides a method and system in which a digital video recorder can be used to allow users to fast forward through segments of a recorded video signal, such as commercial breaks, while still allowing the advertiser a limited opportunity to present an advertising message. Frames from the commercial recorded with the video signal are electronically tagged. When the processor of the digital video recorder finds a tagged frame or frames during a fast forward operation, the processor may display the tagged frame as a static image during the fast forward operation or may play the series of tagged frames at normal speed as a condensed video clip during the fast forward operation. Thus, through a static image or a condensed video clip, an advertiser can present an advertising message, while the user may still skip the full-length commercials as quickly as before.

The present invention may be embodied and described in a video recorder and playback unit receiving a video signal. The recorder includes a processor; a digital data storage device in which the video signal is recorded; and a user input device for issuing playback and fast forward commands to the recorder to control playback of the recorded video signal. During execution of the fast forward command, the processor identifies electronically tagged frames in the recorded video signal and uses the tagged frame or frames to provide an alternative display during execution of the fast forward command.

In a first embodiment of the present invention, the tagged frame is output by the recorder as a static image during the execution of the fast forward command. Preferably, the static image comprises an advertising message.

In a second embodiment of the present invention, the tagged frames are interspersed throughout untagged frames of the recorded video signal and constitute a condensed video clip. The condensed video clip is output at a normal speed by the recorder during the execution of the fast forward command. Preferably, the condensed video clip comprises an advertising message.

The present invention also encompasses the methods of making and operating the system described above. For example, the present invention encompasses a method of providing an advertising message with a video recorder and playback unit that is playing back a recorded video signal by identifying electronically tagged frames in the recorded video signal during execution of a fast forward command and using the tagged frame or frames to provide an alternative display during execution of the fast forward command.

The present invention also encompasses computer-readable instructions stored in or on an appropriate medium for causing the processor or processing device of a video recorder to provide the alternative display feature described above. Specifically, the present invention encompasses computer-readable instructions recorded on a medium for storing computer-readable instructions, where the instructions cause a processor of a video recorder and playback unit that is playing back a recorded video signal to, during execution of a fast forward command, identify electronically tagged frames in said recorded video signal and use said tagged frame or frames to provide an alternative display during execution of said fast forward command.

BRIEF DESCRIPTION OF THE DRAWINGS

The accompanying drawings illustrate preferred embodiments of the present invention and are a part of the specification. Together with the following description, the drawings demonstrate and explain the principles of the present invention.

DETAILED DESCRIPTION OF THE PREFERRED EMBODIMENTS

Stated in general principle, the present invention exists in a system for recording and replaying programming from a commercial television broadcast. A frame or frames of the commercials in the broadcast are tagged with an electronic tag. When a fast forward operation is performed and the recorder/playback device encounters a tagged frame, that frame or frames are used to provide a limited commercial message during the fast forward operation.

Figure 1:
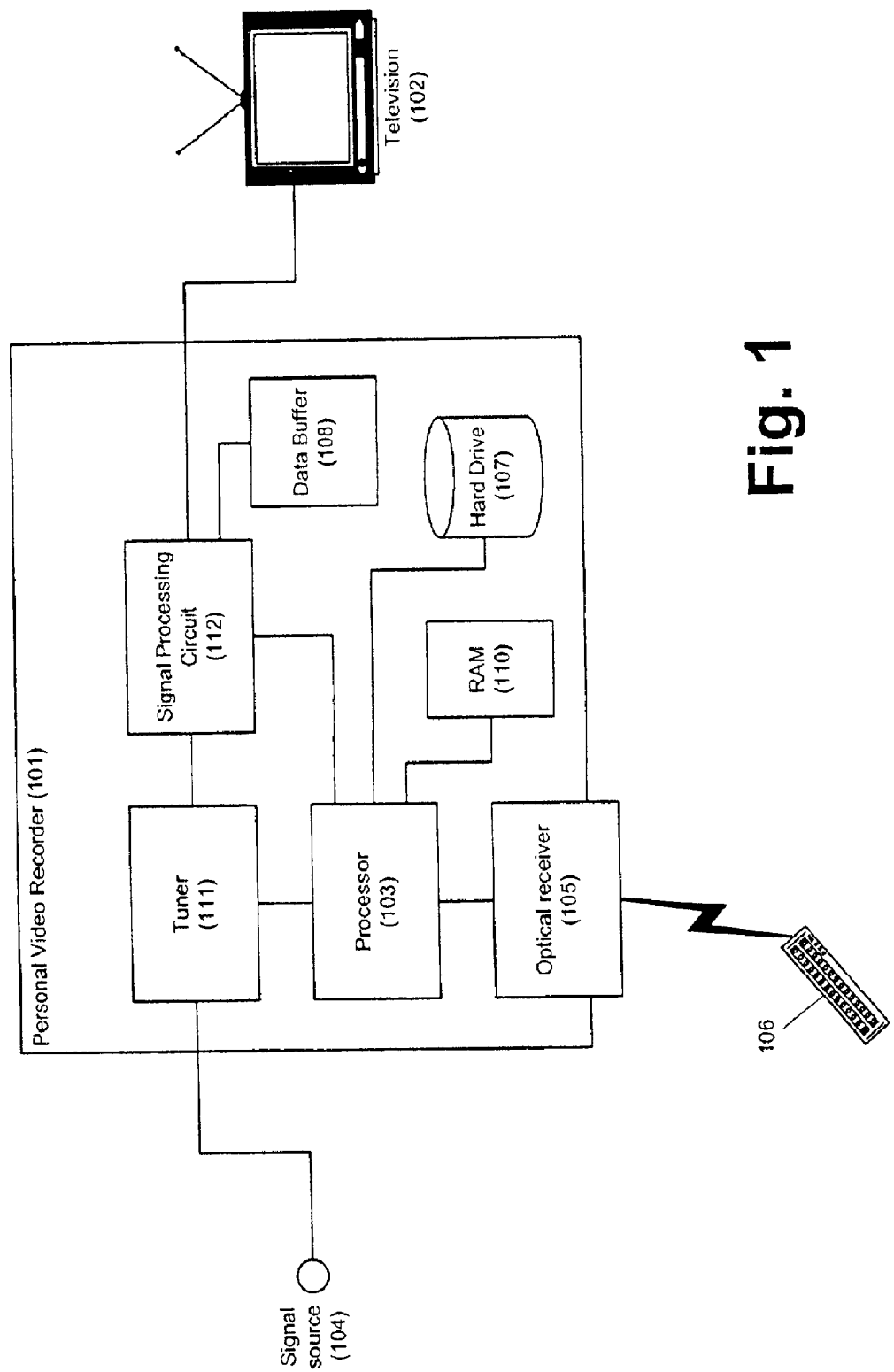
FIG. 1 is a block diagram of a digital video recorder according to the present invention.

FIG. 1 illustrates a recorder/playback device (101) with which the present invention can be implemented. The recorder/playback device (101) illustrated in FIG. 1 is a personal video recorder ("PVR") which uses a hard drive (107) for storage of recorded audiovisual or television signals. However, as will be understood by those skilled in the art, the principles of the present invention could equivalently be practiced with any digital video recording/playback device having a hard drive or other digital memory device for electronically storing the frames of a recorded video (e.g., television) signal.

As shown in FIG. 1, the PVR (101) receives a video signal from a signal source (104). This signal source (104) may be any source of an audiovisual or video signal, for example, a terrestrial television antenna, a cable television system, a satellite antenna, a VCR, another PVR, etc. The signal from the signal source (104) is received by a tuner (111). If the signal from the signal source (104) is a composite television signal including multiple television channels, the tuner (111) tunes a particular channel from the composite television signal and passes the signal for that channel to a signal processing circuit (112) which then outputs the signal to a television set (102) for use by the viewer.

The signal processing circuit (112), which is controlled by a processor (103), may also buffer the video signal in a data buffer (108). This allows the PVR (101) to provide a pause of a live broadcast or a replay of a segment of the broadcast as described above. The signal processing circuit (112) may perform any processing of the signal required to make the signal usable by the television or monitor (102). However, if no such processing is required, the signal processing circuit (112) may simply route the incoming signal, under control of the processor (103), among the output to the television (102), the data buffer (108) and the hard drive (107).

The tuner (111) is also controlled by the processor (103). The processor (103) is also connected to a user input device. Through the user input device, the user can signal the processor (103) and control the tuner (111) to tune the desired channel. The user can also, through the user input device, signal the processor (103) to perform the other various functions of the PVR (101).

The user input device illustrated in the preferred embodiment of FIG. 1 includes a remote control unit (106) which uses an optical transmitter to signal the PVR (101). The PVR (101) consequently includes an optical receiver (105) for reception of the command signals from the remote control unit (106). However, as will be understood by those skilled in the art, the remote control unit (106) and optical receiver (105) may be replaced or supplemented by other user input devices, such as a keypad, switches, buttons, knobs, etc located on the housing of the PVR (101).

The PVR (101) also contains a hard drive (107) on which the processor may record television programming from the signal source (104). As described above, recording may be performed based on immediate commands input to the processor through the user input device (105, 106) or may be based on a timer-controlled recording schedule input to the processor (103) through the user input device (105, 106).

Computer-readable instructions or programming are executed by the processor (103) to allow the processor (103) to provide all the features of the invention described herein. This programming can be stored on the hard drive (107) and read into random-access-memory (110) for use by the processor (103) during execution.

As described above, after programming has been recorded on the hard drive (107), it can be retrieved by the processor (103) and output to the television set (102) for viewing by the user. During this playback, the processor (103) retrieves the stored video signal from the hard drive (107), buffers the retrieved data in the buffer (108) and causes the signal processing circuit (112) to output the retrieved signal from the buffer (108) to the television or monitor (102) at an appropriate rate.

During the playback, the user may signal a fast forward operation through the user input device (105, 106). Upon receipt of this command, the processor (103) will increase the rate at which the frames of the video signal recorded on the hard drive (107) are retrieved and passed to the television (102). As noted above, the user will usually input a fast forward command to speed through commercials and advertisements that have been recorded with the broadcast television signal.

As described in more detail below, when receiving and executing a fast forward command from the user, the processor (103) will check the frames of the recorded video signal for special tags. When these tags are encountered, the processor (103) uses the tagged frame or frames to provide a limited commercial message during the execution of the fast forward command.

Figure 2:
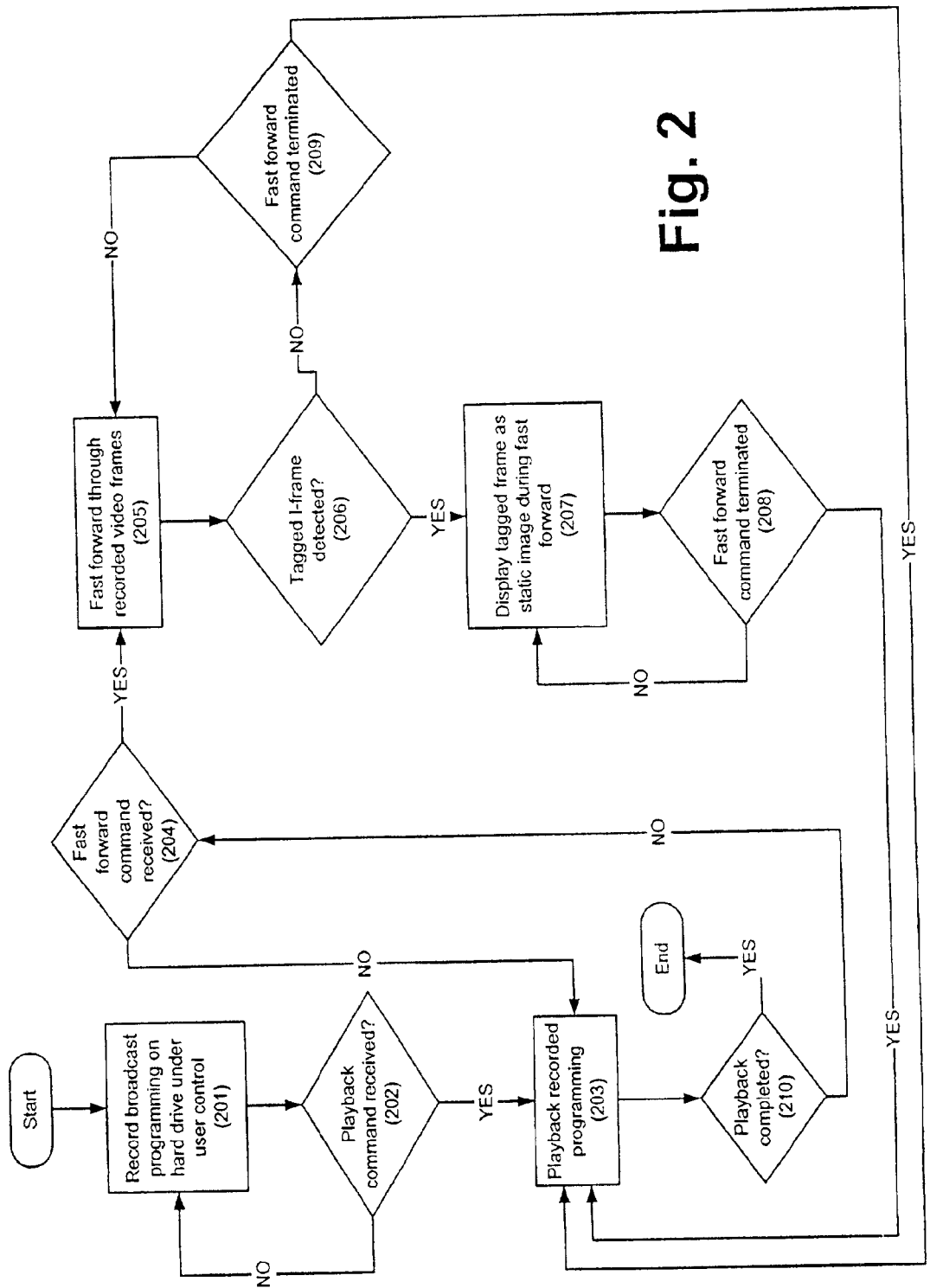
FIG. 2 is a flowchart illustrating a method of providing alternate advertising during a fast forward operation according to a first embodiment of the present invention.

FIG. 2 is a flowchart illustrating a method according to a first embodiment of the present invention. As shown in FIG. 2, the method begins with the user recording broadcast commercial programming using a digital recorder, e.g. a PVR with a hard drive, (201). The user may then initiate playback of the recorded programming (202, 203). When playback is completed (210), the method ends.

During playback, the user may initiate a fast forward command (204) using the recorder's user interface or input device. If the fast forward command is received, the frames of the recorded video signal will be displayed at an accelerated rate (205).

During execution of the fast forward command, the processor of the recorder will check the video i-frames for an electronic tag (206). An I-frame or inter-frame is one of the two complete video frames per second in the MPEG (Moving Pictures Expert Group) standard. Between any two I-frames are P-frames (Predictive Frames) and B-frames) (Bi-directional predictive frames). P- and B-frames contain only information on changes between I-frames. An I-frame with its P- and B-frames is called a GOP (Group of Pictures).

If no tagged frame is detected, the fast forward operation continues until terminated, at which time, normal playback resumes (209). If a tagged frame is detected, that frame is then output by recorder/playback device and displayed on the television set or monitor as a static image that is maintained until the fast forward operation is terminated (207). This static image is preferably an advertising image, including, for example, a company logo or name, a picture of the product being advertised, a celebrity endorser, etc. The static image is replaced when normal playback is resumed upon termination of the fast forward operation (208). Alternatively, the static image may be terminated when a second tagged frame is detected that indicates the end of the commercial break in the recorded video programming.

In this way, the viewer is still able to swiftly skip over the full-length commercials recorded with the desired programming. However, the advertiser can also still make a subdued (less brash) exposition of its product or services to the viewer.

As will be understood by those skilled in the art, the above-described method could be modified to, for example, display two or more static images based on tagged I-frames during the execution of the fast forward command. The length of time each static image is presented may be proportional to the normal running time of a full-length commercial corresponding to the static image which is being skipped by the fast forward operation.

The first frame of a commercial message may be the tagged I-frame. If the video signal is recorded on a recording device that does not recognize tagged I-frames under the principles of the present invention, the tagged frame will be displayed as any normal frame for about $\frac{1}{30}$ of a second. Such a brief presentation of the frame will be imperceptible to the human eye. Thus, a broadcast video signal that includes electronically tagged i-frames bearing static advertising images will demonstrate no adverse effect or problem if the broadcast is received or recorded by equipment that does not recognize the electronic tag.

Figure 3:
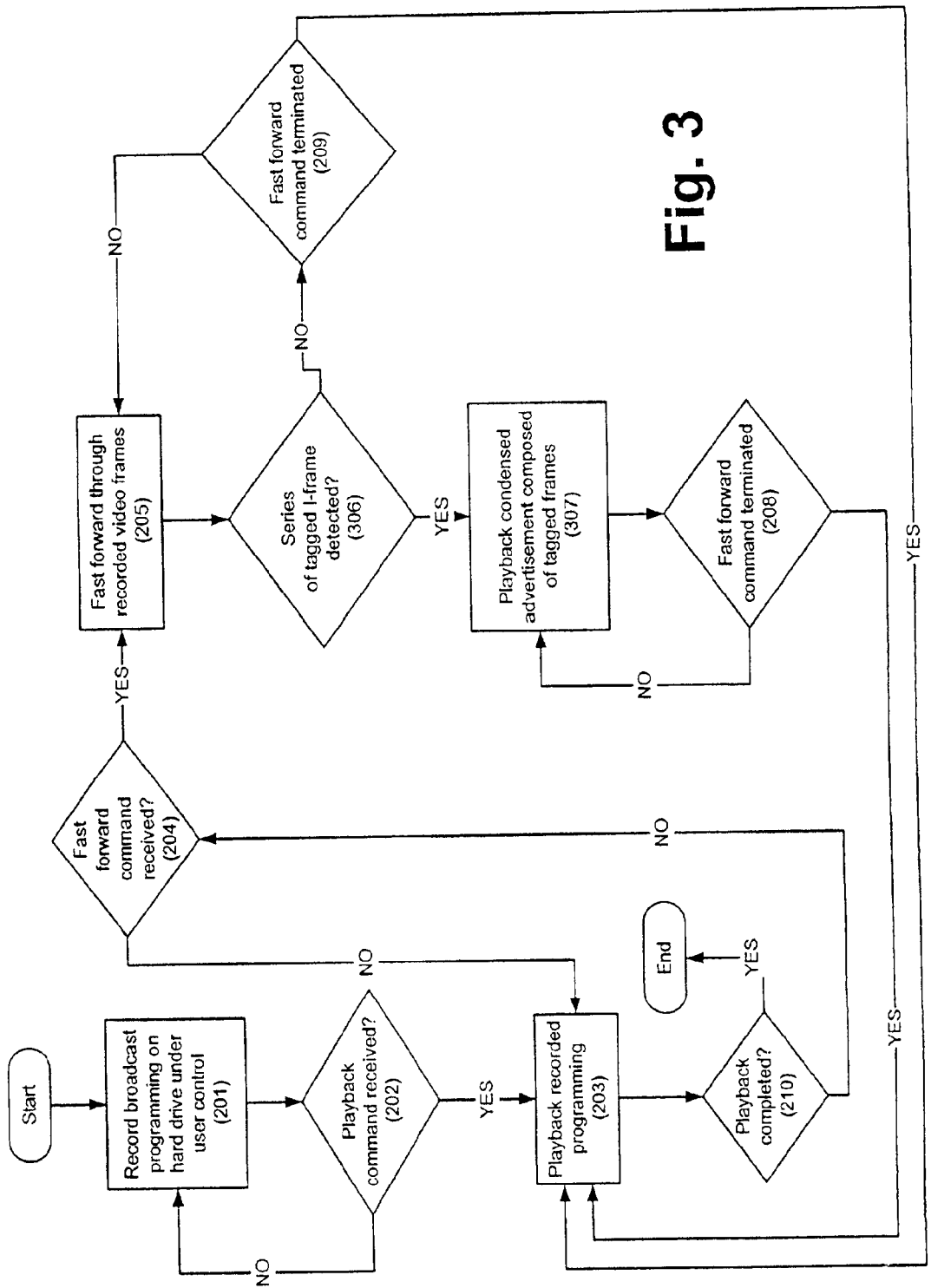
FIG. 3 is a flowchart illustrating a method of providing alternate advertising during a fast forward operation according to a second embodiment of the present invention.

FIG. 3 is a flowchart illustrating a second method according to a second embodiment of the present invention. Much of the method is similar to that illustrated in FIG. 2. Identical steps in the methods have been given identical reference numbers and a redundant explanation of these method steps will be largely omitted.

As shown in FIG. 3, after a user has recorded (201) and initiated playback (202, 203) of commercial video signal, a fast forward command (204) may be given by the user. Upon receipt of the fast forward command, as before, the processor accelerates the display of the frames of the recorded video signal (205) and searches the frames for an electronic tag (306). This electronic tag may be different from the electronic tag described above in connection with FIG. 2 so that both embodiments can be used together is a single system.

Upon detection of a frame being this second-type of electronic tag, the processor looks for a succeeding series of tagged I-frames (306). These tagged frames, as they are identified, are output by the recorder/playback device to the television set or other video monitor at normal speed (307) (e.g., 30 to 60 frames per second). Thus, the tagged I-frames, interspersed regularly among the other frames of the video segment, e.g. a commercial, being skipped by the fast forward operation constitute a condensed video clip, perhaps a third the length of the video segment skipped by fast forwarding.

This condensed video clip can be used to present an abbreviated commercial message (307). Thus, again, the user may move through the commercials recorded with the video signal at an accelerated rate using the fast forward operation of the playback unit. However, the advertiser also still has a chance to present a commercial message to the viewer.

Figure 4:
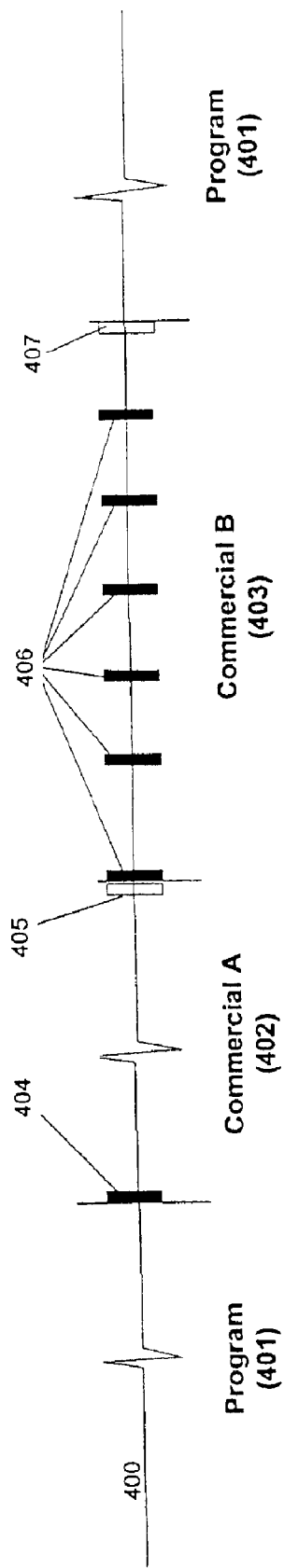
FIG. 4 is a diagram illustrating the interspersion of tagged video frames in an audiovisual signal according to the present invention.

FIG. 4 further illustrates the interspersion of the tagged video frames of the present invention in an audiovisual signal that is being broadcast or has been recorded and is being replayed. As shown in FIG. 4, the audiovisual signal (400) includes signal segments (401) that provide the frames of the main program being carried by the audiovisual signal (400). Between program segments (401) is a commercial break which, in this example, includes two commercials, Commercial A and Commercial B. The segment of the signal (400) carrying the frames of Commercial A is indicated at (402). The segment of the signal (400) carrying the frames of Commercial B is indicated at (403).

Given the preceding explanation of the present invention, Commercial A (402) is an example of a commercial during which a static image will be provided by the playback system of the present invention if a user fast forwards through a recording of Commercial A. The initial frame (404) of Commercial A is a tagged frame that causes the playback system (101) of the present invention to display that frame (404) as a static image while the system (101) fast forward through Commercial A.

When the signal (402) carrying Commercial A has been passed during the playback or fast forward operations, the playback system (101) encounters the last frame (405) of Commercial A. Frame (405) is also tagged and causes the playback system (101) to terminate the static image of frame (404) being displayed.

Commercial B is carried by the next segment (403) of the audiovisual signal (400). Commercial B (403) has interspersed therein a number of evenly spaced frames (406). These frames (406) are tagged and, when the playback system (101) is fast forwarding through a playback of the signal (400), the frames (406) arrive rapidly enough to be played by the playback system (101) as an abbreviated advertising message that replaces the longer message of Commercial B (403).

Frame (407) at the end of Commercial B (403) is also tagged and indicates to the playback system (101) that the advertising message composed of the interspersed frames (406) has ended. If the fast forward operation is then continued through the program (401), the playback device (101) may then display the frames of program (401) at an accelerated rate as is the case with most conventional playback devices during a fast forward operation.

The present invention also encompasses the computer-readable instructions required to make the processor of a digital video recorder operate in the manner described above. Specifically, the present invention encompasses computer-readable instructions recorded in a medium for storing computer-readable instructions which cause the processor of a digital video recorder to identify electronically tagged frames in a video stream during a fast forward operation and use those frames to provide either a static image or a condensed video clip with an advertising message.

As used herein, the term "computer-readable instructions" includes both software and firmware, irrespective of the language in which written and the level at which written (e.g. object code, source code, etc.). The firmware may include an application specific integrated circuit (ASIC) or the like.

The preceding description has been presented only to illustrate and describe the invention. It is not intended to be exhaustive or to limit the invention to any precise form disclosed. Many modifications and variations are possible in light of the above teaching. For example, another alternative with disk-based video signal storage would be to play all the commercials at one time and then play the program without commercial interruption.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A video recorder and playback unit receiving a video signal, the recorder comprising:
   a processor;
   a digital data storage device in which said video signal is recorded; and
   a user input device for issuing playback and fast forward commands to the recorder to control playback of said recorded video signal;
   wherein, during execution of said fast forward command, said processor identifies electronically tagged frames in said recorded video signal and uses said tagged frame or frames to provide an alternative display during execution of said fast forward command.

2. The recorder of claim 1, wherein said tagged frame is output by said recorder as a static image during said execution of said fast forward command.

3. The recorder of claim 2, wherein said static image comprises an advertising message.

4. The recorder of claim 1, wherein said tagged frames are interspersed throughout untagged frames of said recorded video signal and comprise a condensed video clip which is output at a normal speed by said recorder during said execution of said fast forward command.

5. The recorder of claim 4, wherein said condensed video clip comprises an advertising message.

6. A method of providing an advertising message with a video recorder and playback unit that is playing back a recorded video signal, the method comprising, during execution of a fast forward command, identifying electronically tagged frames in said recorded video signal and using said tagged frame or frames to provide an alternative display during execution of said fast forward command.

7. The method of claim 6, further comprising outputting said tagged frame with said recorder as a static image during said execution of said fast forward command.

8. The method of claim 7, further comprising providing an advertising message as said static image.

9. The method of claim 6, further comprising:
   composing a condensed video clip of said tagged frames which are interspersed throughout untagged frames of said recorded video signal; and
   outputting said condensed video clip at a normal speed with said recorder during said execution of said fast forward command.

10. The method of claim 9, further comprising including an advertising message in said condensed video clip.

11. A video recorder and playback unit receiving a video signal, the recorder comprising:
    a processor means;
    a digital data storage means in which said video signal is recorded; and
    a user input means for issuing playback and fast forward commands to the recorder to control playback of said recorded video signal;
    wherein said recorded video comprises one or more frames having an electronic tagging means and, during execution of said fast forward command, said processor means identifies electronically tagged frames in said recorded video signal and uses said tagged frame or frames to provide an alternative display during execution of said fast forward command.

12. The recorder of claim 11, wherein said tagged frame is output by said recorder as a static image during said execution of said fast forward command.

13. The recorder of claim 12, wherein said static image comprises an advertising message.

14. The recorder of claim 11, wherein said tagged frames are interspersed throughout untagged frames of said recorded video signal and comprise a condensed video clip which is output at a normal speed by said recorder during said execution of said fast forward command.

15. The recorder of claim 14, wherein said condensed video clip comprises an advertising message.

16. Computer-readable instructions recorded on a medium for storing computer-readable instructions, said instructions causing a processor of a video recorder and playback unit that is playing back a recorded video signal to, during execution of a fast forward command, identify electronically tagged frames in said recorded video signal and use said tagged frame or frames to provide an alternative display during execution of said fast forward command.

17. The instructions of claim 16, wherein said instructions further cause said processor to output said tagged frame from said recorder as a static image during said execution of said fast forward command.

18. The instructions of claim 17, wherein said static image comprises an advertising message.

19. The instructions of claim 16, wherein said tagged frames are interspersed throughout untagged frames of said recorded video signal and comprise a condensed video clip, said instructions causing said processor to output said condensed video clip at a normal speed from said recorder during said execution of said fast forward command.

20. The instructions of claim 19, wherein said condensed video clip comprises an advertising message.

\* \* \* \* \*

UNITED STATES PATENT AND TRADEMARK OFFICE
CERTIFICATE OF CORRECTION

PATENT NO. : 6,909,837 B1  Page 1 of 1
DATED : June 21, 2005
INVENTOR(S) : Robert Allen Unger It is certified that error appears in the above-identified patent and that said Letters Patent is hereby corrected as shown below:

<u>Title page,</u>
Item [73], Assignee, please change "Sony Corporation, Tokyo (JP)" to
-- Sony Corporation, Tokyo (JP)
   Sony Electronics, Inc., Park Ridge, NJ (US) --.

Signed and Sealed this

Twenty-seventh Day of September, 2005

JON W. DUDAS
*Director of the United States Patent and Trademark Office*